Feb. 4, 1936.  F. S. KLEIN  2,029,876
WALL BLOCK COUPLING
Filed Dec. 18, 1934
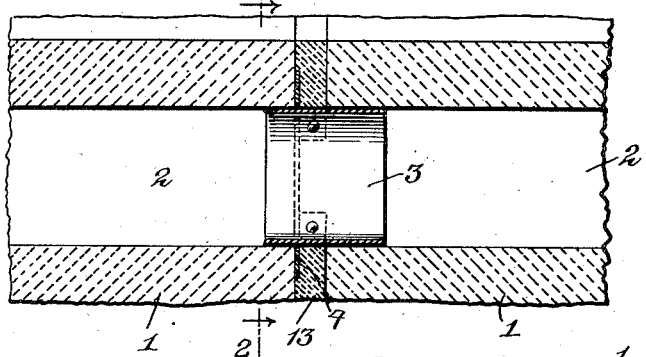
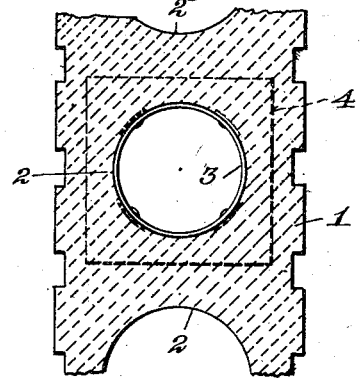
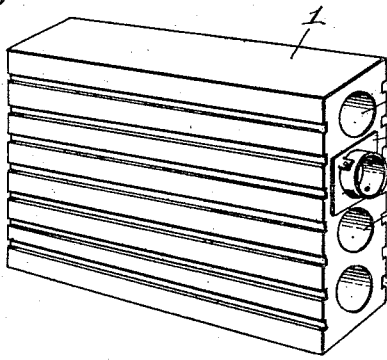
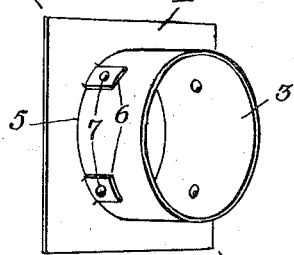
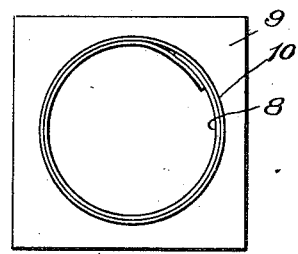
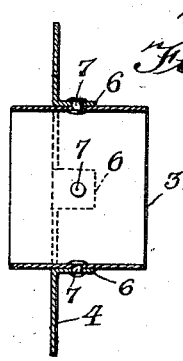
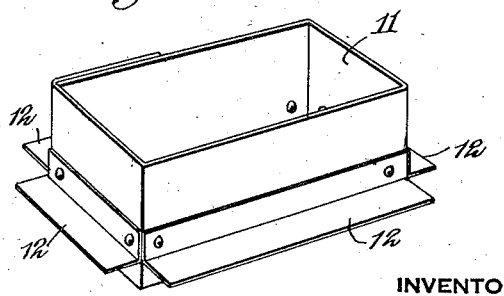
WITNESSES
INVENTOR
Franklin S. Klein
BY
Munn, Anderson & Liddy
ATTORNEYS Patented Feb. 4, 1936

2,029,876

UNITED STATES PATENT OFFICE 2,029,876

WALL BLOCK COUPLING

Franklin S. Klein, Malverne, N. Y.

Application December 18, 1934, Serial No. 758,132

5 Claims. (Cl. 72—107)

This invention relates to wall block couplings, an object of the invention being to utilize for a practical purpose the hollow spaces in hollow building blocks, as a conduit for electrical wires when such blocks are used for building walls.

As the name implies this device will be used to couple together the hollow space in one building block to the hollow space in the next building block, when hollow building blocks are used to build a wall. Thus this invention couples together any series of hollow spaces in a wall that occur in a straight line. Converting these hollow spaces into one continuous and unobstructed hollow space or passageway the full length or height of the wall by the simple means of excluding the cement at the joints of the building blocks.

The practical advantage of this raceway as a duct for electrical wiring is readily apparent.

An object is to use this space as a duct or wireway for drawing in or withdrawing electric wires for any of the purposes for which electric wires are used, and affords the same facilities for performing this work as any other type of conduit or duct of equal size for electric wire, An object is to use this device to make convenient and economical the extension of electric wire for any purpose on all side walls with the minimum of damage to the finished building.

An object of this device is to eliminate a great deal of unsightly exposed wiring along walls that are built of hollow building blocks.

An object is to use this device for convenient electric wiring at any time safe from mechanical injury.

An object is to provide a passage way for wire which by means of suitable electrical devices now in common use, this wireway or duct through the multiple of hollow spaces in the building blocks of which the wall is made, can be joined and made continuous with other types of electric conduit (whether rigid iron conduit, flexible iron conduit, metal molding or under-floor duct, all such as used on electrical installations of good quality) and thereby to any center of electrical distribution or supply.

An object is to introduce the wire into this wireway at any point desired along the length of this duct by simply cutting a small hole through the wall of the building block and into the wire chase or by having any suitable type of electric conduit conveniently terminated within this wire duct.

An object is to make it convenient to have an outlet where desired, for wire already installed or to be installed in this wire raceway any place along the length of the passage by cutting a small hole through the wall of the building block and into the wire duct at the point desired.

An object is to make the wire installed in this duct equally accessible on either side or both sides of the wall.

An object is to make the cross-sectional shape of this device to conform to any and all of the various sizes and shapes of all the different types and sizes of building blocks used for building walls. Always these different shaped "Wall Block Couplings" are for the same purpose and afford the same convenience.

An object is to compose this device of some material thin enough as not to materially diminish the hollow space within the building block at the place where the device is used.

An object is to compose this device of some material which will not materially reduce the tensile strength of the wall, so far as consistent with the other valuable features of the invention.

An object is to compose the device of some material that can easily be cut away when it is desired to locate an outlet for electric wires at the point at which a wall coupling has been installed.

An object is to make this device of some insulating material that will not conduct electric currents from one wire to another.

An object is to make the device of some material which will not require electrical grounding connections such as are used when metal is used for electric wire conduit.

An object is to provide a male device each end of which will be used to enter the hollow space of a building block thereby connecting both hollow spaces together.

This device will have an annular flange or rib fastened about midway on the length of the tube to prevent escape into the hollow space within the building block.

This device will have an annular flange fastened about midway on the length of the tube on the outer side which will become engaged with the brick cement which is used and thereby hold the wall coupling in position.

This device will have a flange on the outer side to reinforce the strength of the device and maintain the cross-sectional shape.

This device shall have an outer flange firmly fastened to the circumference or all sides about midway on the length of the main body which will baffle any attempt to draw wire through the raceway by any means except through the inside of the device.

This device will have a coating of water and acid resisting paint.

I believe this device will advance the art of electric wiring due to its neatness, convenience, economy and the safety from mechanical damage which it provides.

With these and other objects in view, the invention consists in certain novel features of construction and combinations and arrangements of parts, all of which will be more fully hereinafter described and pointed out in the claims.

In the accompanying drawing,

Figure 1 is a fragmentary view in longitudinal section illustrating my improved coupling in operative position;

Figure 2 is a view in transverse section on the line 2—2 of Figure 1;

Figure 3 is a perspective view of a wall block showing my improved coupling at the end thereof;

Figure 4 is a perspective view of the coupling;

Figure 5 is a view in section on the line 5—5 of Figure 4;

Figure 6 is a view in end elevation illustrating a modification; and

Figure 7 is a perspective view illustrating another modification.

1—1 represent wall blocks, and these wall blocks are provided with hollow spaces 2 extending longitudinally through the same. The blocks are disposed end to end and cemented together to form a wall, and during the operation of building the wall I locate my improved couplings 3 in aligned passages so that the passage in the wall containing the couplings constitutes a continuous unobstructed passage for electric wires or other objects.

My improved coupling comprises a tube with a flange or rib 4 secured around the same intermediate its ends. The invention is, of course, not limited to the material employed nor to the particular manner of securing the flange or rib. In the form of the invention illustrated in Figures 1, 2, 3, 4 and 5 of the drawing the rib is shown of rectangular shape, having a central opening 5 to receive the tubular coupling 3, and this flange or rib is formed with tongues 6 bent at right angles thereto and secured to the coupling 3 by means of rivets 7.

In the modification illustrated in Figure 6 of the drawing, the tubular coupling member 8 corresponding to the member 3 is composed of a sheet bent into cylindrical form, and the flange or rib 9 corresponding to the flange or rib 4 is made with an annular extension 10 secured to the coupling.

The modification illustrated in Figure 7 discloses a rectangular shape of coupling 11 with flanges or ribs 12 secured to the outer face thereof intermediate its ends. It is to be understood that the coupling may be made of any cross sectional shape to conform to the cross sectional shape of the passage in which it is located, and in building the wall the couplings are inserted in the passages at the exposed end of the wall and then other blocks are brought against the ends of the blocks containing the couplings and the space between the blocks is filled with cement, as indicated at 13. It will thus be noted that the coupling projects into the aligned spaces 2 of adjacent blocks and the flange or rib 4 is disposed between the ends of the block. The couplings, therefore, prevent any entrance of cement into the passage, and when the wall is complete they bridge the ends of the blocks and, hence, ensure a complete, continuous, unobstructed passage, as above explained.

While I have illustrated what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A wall block coupling adapted to bridge the gap between wall blocks and form with passages in the wall blocks a continuous smooth conduit for electric wires, said coupling comprising a tubular member open at both ends and of uniform internal diameter throughout its length forming an unobstructed passage, and a flange or rib around the tubular member intermediate its ends.

2. A wall block coupling adapted to bridge the gap between wall blocks and form with passages in the wall blocks a continuous smooth conduit for electric wires, said coupling comprising a tubular member open at both ends and of uniform internal diameter throughout its length forming an unobstructed passage, and a flange or rib around the tubular member intermediate its ends, said flange or rib secured to the coupling.

3. A wall block coupling adapted to bridge the gap between wall blocks and form with passages in the wall blocks a continuous smooth conduit for electric wires, said coupling comprising a tubular member open at both ends and of uniform internal diameter throughout its length forming an unobstructed passage, said tubular member of a cross sectional shape conforming to the cross sectional shape of passages in wall blocks, and adapted to bridge the meeting ends of the blocks when located in the passages, and a flange or rib fixed around the outside of the coupling and adapted to be disposed between the ends of the blocks.

4. In a wall construction, the combination with a series of alined blocks having longitudinal passages therein, and couplings projecting into the adjacent ends of the alined passages in adjacent blocks, said couplings comprising tubular members open at both ends and of uniform internal diameter throughout their length forming unobstructed passages, and flanges or ribs secured intermediate the ends of the couplings around the outside thereof and positioned between adjacent blocks limiting the longitudinal movement of the couplings in the blocks.

5. A wall block coupling, comprising a tubular member open at both ends and of uniform diameter throughout its length forming an unobstructed passage, a plate having a central opening receiving the tube and located intermediate the ends of the tube, and tongues on the plate at the opening therein secured to the outer face of the tube.

FRANKLIN S. KLEIN.